April 21, 1959   R. A. ROBERTS, JR   2,883,228
CLOSURE FASTENER
Filed June 1, 1956
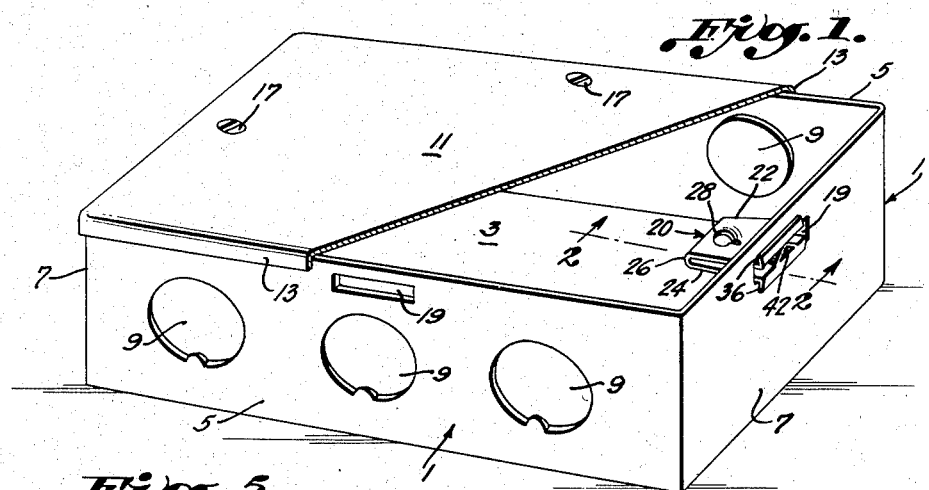
Fig. 1.
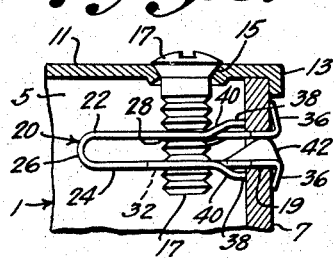
Fig. 5.
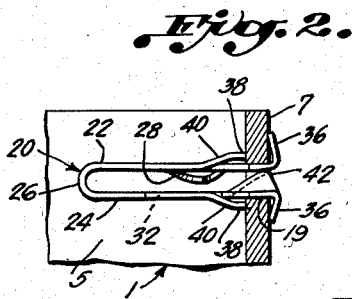
Fig. 2.
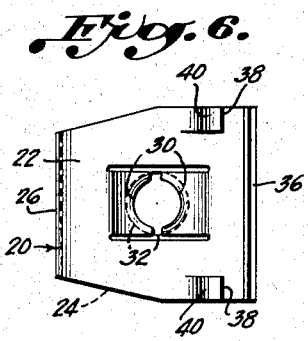
Fig. 6.
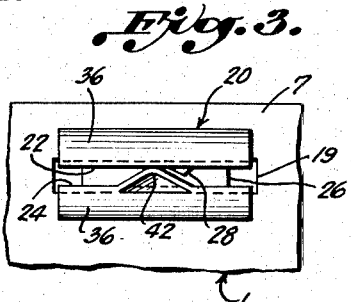
Fig. 3.
Fig. 4.
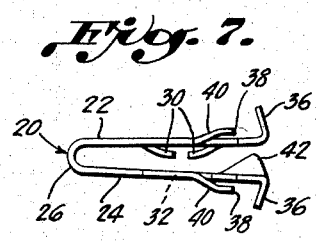
Fig. 7.
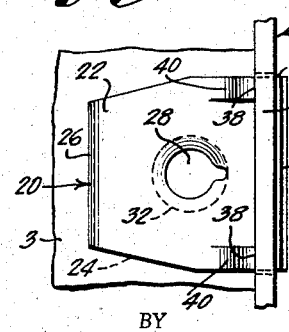
INVENTOR
RAYMOND A. ROBERTS, JR.
BY
H. J. Lombard
ATTORNEY

United States Patent Office 2,883,228
Patented Apr. 21, 1959

2,883,228

CLOSURE FASTENER

Raymond A. Roberts, Jr., Cleveland, Ohio, assignor to Tinnerman Products, Inc., Cleveland, Ohio, a corporation of Ohio Application June 1, 1956, Serial No. 588,790

6 Claims. (Cl. 292—256.71)

This invention relates in general to closure fasteners and, more particularly, to closure fasteners for securing the covers or fronts on sheet metal electrical outlet and switch or junction boxes, cabinets, and like receptacles and containers.

In the manufacture of such sheet metal electrical boxes and cabinets, and the like, it has been the usual practice to form the boxes with integral inturned flanges or ears having tapped holes by which a cover or front may be secured thereon by bolts or screws threaded into said tapped holes.

A considerable part of the cost and expense of manufacture resides in providing the boxes with such integral inturned flanges inasmuch as the same involve a sizable added area of the sheet metal blank necessary to provide for said integral inturned flanges, together with special operations for the stamping, forming and tapping thereof in the completed box structure.

A primary object of this invention is to provide an improved construction for such electrical boxes and cabinets, and the like, at greatly reduced cost by eliminating the integral inturned flanges or ears heretofore provided, in favor of combined nut and clip fasteners in accordance with the invention which are readily attached to the walls of the boxes and cabinets to serve the same function and purpose in securing the covers, fronts or other closures thereon.

Another object of the invention is to provide an improved box or cabinet construction, as described, in which said combined nut and clip fasteners are in the form of a simple, low cost substantially U-shaped snap fastening devices adapted to be easily and quickly attached in a simple opening in a wall of the box, cabinet or other receptacle in operative position for securing the cover, front or other closure thereon, as aforesaid.

A further object of the invention is to provide an improved fastening construction of this character, in which the fastener in the form of a combined nut and clip device is readily employed for securing panels, plates and similar parts positioned in normal or other angular relation to each other in a completed assembly.

Further objects and advantages, and other new and useful features in the construction, arrangement and general combination of parts and elements of the invention will be apparent as the following description proceeds with reference to the accompanying drawings, for purposes of illustration but not of limitation, in which like reference characters designate like parts throughout, and in which:

Fig. 1 is a perspective view of an electrical box, cabinet, or other receptacle, with a fragmentary showing of the cover, front or closure therefor, and shows the receptacle as provided with a combined nut and clip fastener in accordance with the invention for securing the closure thereon;

Fig. 2 is a sectional view of Fig. 1 along line 2—2, looking in the direction of the arrows;

Fig. 3 is a fragmentary side elevational view from the right of Fig. 2 showing the attachment of the fastener as seen from the outer side of the receptacle;

Fig. 4 is a fragmentary top plan view of Fig. 2 showing the fastener as attached to the wall of the receptacle and extending from the inner side thereof in position to receive a bolt or screw for securing a closure over said receptacle; and Fig. 5 is a sectional view similar to Fig. 2 showing a bolt or screw applied to the fastener to secure a closure onto the receptacle.

Fig. 6 is a top plan view of a similar form of fastener provided with an alternate type of thread engaging means; and, Fig. 6 is a top plan view of a similar form of fastener provided with an alternate type of thread engaging means; and, Fig. 7 is a side or edge elevational view of the fastener shown in Fig. 6.

The improved fastener and fastening construction of the invention is disclosed in connection with the use thereof for securing the cover, front or other closure onto electrical boxes and cabinets, and similar receptacles. It is obvious, however, that the invention, otherwise, involves a fastening construction of general utility in that the fastening arrangement and general form of the fasteners employed are readily adapted for a wide range and variety of applications and uses as the means for securing an assembly in which the edge portion of a plate or panel is connected directly to the surface of a cooperating plate, panel or other part as, for example, in a partition construction, or other structure wherein the edge portion of a plate or panel is positioned in normal or other angular relation to the part to which it is secured.

Referring now, more particularly, to the drawings, Fig. 1 shows by way of example, a typical form of electrical outlet box, cabinet or receptacle, designated generally 1, comprising a base or bottom 3, side walls 5, and end walls 7 in a conventional construction, and provided, if desired, with preformed knock-out discs 9 or otherwise perforated to provide passages to apparatus mounted within said box 1.

A cover, front, or other closure for the box or receptacle, designated generally 11, is shown provided with an overhanging peripheral flange or skirt 13 together with suitable holes 15, Fig. 5, for bolts, screws or other studs 17 to be applied to the fasteners 20 attached to the walls 5, 7, of the box 1 for securing the cover or front 11 thereto, as presently to be described. The box or cabinet 1 may thus be manufactured advantageously at relatively low cost inasmuch as only a minimum size sheet metal blank is required without need for extensions to provide the integral flanges or ears heretofore employed.

The cover, front, or other closure 11, Fig. 1, is thus provided at selected locations adjacent its periphery with any suitable or desired number of bolts or screws 17 to be applied to a similar number of fasteners 20 attached in corresponding locations to the walls 5 and 7 of the box or cabinet 1. In any such location, as shown in Figs. 1–4, inclusive, by way of illustration, the wall 7, for example, is provided with a transverse slot or similar opening 19 in a predetermined spacing from the adjacent upper end of said wall 7 as necessary to provide for the attachment of a fastener 20 in said slot in position for receiving a cooperating bolt, screw or other stud 17 for securing said front, cover or other closure 11 thereon. Such an opening 19 may be provided in any other suitable shape or configuration to provide a similar fastener receiving recess but preferably is formed as a simple substantially rectangular slot, as shown.

The combined nut and clip fastener, designated generally 20, is provided from a relatively small and inexpensive blank of sheet metal which is readily obtained from standard sheet metal strip stock with relatively little loss or waste of material. Any suitable sheet metal may be employed but preferably that of a spring metal nature such as spring metal or cold rolled metal having spring-like characteristics.

The blank for the fastener 20 is such as to define a snap fastening device in the form of a generally U-shaped shank member comprising a pair of spaced body portions or arms 22, 24, joined by a return bend 26 at the leading end thereof which, preferably, is of a size slightly smaller than the wall opening or slot 19 so as to be readily received therein in the initial application of said fastener 20 to attached position in said wall opening or slot 19.

One of said body portions, preferably the upper or outer body portion 22, is provided with a suitable nut or equivalent bolt, screw or other stud engaging means such as tongues or similar thread engaging elements 28, Figs. 1-5, inclusive, where such stud engaging means are shown provided in the manner of a keyhole type of aperture 28 comprising radial tongues bordering said aperture. As shown in Figs. 6 and 7, similar and equivalent thread engaging elements 30 are provided from the sheet metal material of said body portion 22 of the fastener by an aperture intermediate spaced parallel slits which form co-operating tongues, or the like, having spaced extremities defining the desired thread or thread opening corresponding substantially to the root diameter of the associated bolt or screw 17 for threadedly engaging the thread thereof. Said tongues 30, otherwise, are preferably formed to project out of the plane of the underface of said body portion 22 and are bent lengthwise in substantial ogee formation to provide for the maximum strength obtainable to withstand the tightening action of the bolt or screw 17 as it is advanced to final applied fastening position therewith.

Such stud engaging means 28, Figs. 1-5, inclusive, and 30, Figs. 6 and 7, may be pressed, stamped, extruded, or otherwise provided on the fastener 20 in any suitable form or construction and, in this relation, the present invention fully contemplates the provision of such thread engaging means in various other similar and related forms, as in the manner of a perforated protuberance which is pressed from the sheet metal and tapped for threadedly engaging the bolt or screw. However, thread engaging means prepared in the form of cooperating, resilient tongues 30, Figs. 6 and 7, as shown, are possessed of unusual inherent strength and will not collapse or pull through when the bolt or screw 17 is tightened, nor loosen under continuous strain and vibration in the installation. This takes place by reason of the fact that the sheet metal material from which such tongues 30 are formed is of less thickness than the pitch or spacing between adjacent thread convolutions of the bolt or screw 17, wherefore the extremities of said tongues 30 tend, more effectively, to move toward each other and dig into the grooves intermediate adjacent thread convolutions of the bolt or screw 17 when tightened, and otherwise become embedded in the root of the bolt or screw in locked, frictional fastening engagement therewith, thereby providing an automatic thread lock on said screw or bolt 17 in any tightened position thereof which prevents accidental loosening of the same under the most severe conditions of vibration, or the like. Thus, in the present example, the tongues 30, Figs. 6 and 7, are shown as extending out of the plane of the underface of the body portion 22 in substantially ogee formation and provided preferably with arcuately notched extremities, forming substantial biting jaws adapted to cut into the root of the bolt or screw 17 and the adjacent thread surfaces thereon in positive locking relation therewith in the most effective manner. There is thereby eliminated the necessity for a separate, auxiliary locking means such as a lock nut or lock washer which, of course, provides for considerable savings in eliminating the cost of such locking devices and the expense involved in the tedious, time consuming assembling operations and other added steps in manufacture which these auxiliary locking means require. It is to be understood, however, that the present invention is not limited in any manner or form to the illustrated construction of the tongues or thread engaging means 28, Figs. 1-5, inclusive, or 30, Figs. 6 and 7, but rather, fully contemplates any similar and related form of stud engaging means as well as any suitable nut welded, swaged, or otherwise secured to said body portion 22 of said fastener 20. In the completed fastener, said thread engaging elements 28 or 30, or equivalent stud engaging means, are provided on said body portion 22 in the predetermined position for threadedly engaging the associated bolt or screw 17 in a completed assembly as shown in Fig. 5.

The other body portion 24 is formed with a suitable hole 32 which is aligned with the stud engaging means 28 or 30 on the body portion 22 and provides for suitable passage of the leading end of the bolt or screw 17 through said body portion 24 in the secured position of said bolt or screw 17 with said fastener 20 as shown in Fig. 5.

The outer ends of said spaced body portions 22, 24, terminate in similar outwardly extending resilient head portions 36, which preferably are bent to extend in inwardly inclined relation toward said spaced body portions 22, 24, in a manner to provide for an axial drawing action on said spaced body portions 22, 24, in the secured position thereof in the wall opening or slot 19, as presently to be described.

The spaced body portions 22, 24, are each provided with one or more sheared tabs defining outwardly projecting shoulders 38 spaced from said head portions 36 a distance approximating the thickness of the wall 7 in a manner whereby said shoulders 38 are adapted to positively engage the inner side of said wall 7 in cooperation with said head portions 36 resiliently engaging the outer side of said wall 7 as shown in Figs. 2 and 4. As best seen in Figs. 4 and 6, each of the body portions 22, 24 preferably is provided with a pair of said shoulders 38 defined by sheared tabs along the side edges of said body portions 22, 24. Such shoulders 38 may be provided in any other suitable construction and formation as in the manner of a cam shoulder, or the like. In the preferred construction shown, the sheared tabs are formed to define inclined guide surfaces 40 leading to sharp, pronounced outwardly projecting shoulders 38 adapted to positively engage marginal portions of the wall 7 adjacent the slot 19 to provide a firm, rigid and positive lock of the fastener 20 in attached position in said slot 19 as seen in Fig. 2.

A spacing abutment 42 is provided on the inner surface of either of said spaced body portions 22, 24, to limit the compression thereof toward each other in attached position in the slot 19 as necessary to retain said shoulders 38 in proper outwardly projecting relation in positive locking engagement with the marginal portions of said slot 19, as aforesaid. The spacing abutment 42 may be provided by any suitable projection or protuberance, or the like, but preferably is formed on the lower body portion 24 by a sheared strip, as seen in Fig. 3, which is bent inwardly out of the plane of said body portion 24 to define the desired spacing abutment 42. In the completed fastener 20, the spaced body portions 22, 24, preferably have a slightly diverging relation, as seen in Fig. 7, and assume a substantially parallel spaced relation in attached position in the wall opening or slot 19, as limited by said spacing abutment 42, substantially as shown in Fig. 2.

The completed fastener 20, thus provided, is easily and quickly applied to attached position in the wall opening or slot 19 in the wall 7 simply by inserting the leading end 26 of the fastener into said slot 19 from the outer side of said wall 7 and pushing the same axially to the fully attached position thereof seen in Figs. 2 and 4. As shown in Fig. 7, the spaced body portions 22, 24, when normally untensioned, extend in slightly diverging relation from the leading end 26 of the fastener 20 which, preferably, is of a size slightly smaller than the wall opening or slot 19, as aforesaid, so as to be readily received therein to facilitate the initial step in the application of the fastener to attached position.

As pressure is exerted on the resilient head portions 36 to advance the fastener axially through said wall opening or slot 19, the diverging body portions 22, 24 cam against the sides of said slot 19 and are thereby compressed and tensioned in substantially parallel relation as limited by the spacing abutment 42. As the tabs defining the shoulders 38 pass through said slot 19, the inclined guide surfaces 40 on said tabs engage the sides of said slot 19 in a camming action which forces said tabs inwardly toward each other as necessary to permit said shoulders 38 to pass through said slot 19 and clear the inner side of said wall 7 where said shoulders 38 are free to spring outwardly into positive locking engagement with the marginal portions of said wall 7 adjacent said slot 19.

The inwardly inclined resilient head portions 36 are so provided that the ends of said head portions 36 engage the outer side of the wall 7 just prior to the aforesaid locking engagement of the shoulders 38 with the inner side of said wall 7. The pressure exerted on said inwardly inclined head portions 36 biases the same slightly outwardly in tensioned engagement with the outer side of the wall 7 such that the spaced body portions 22, 24, are movable axially inwardly as necessary for the shoulders 38 thereon to clear the slot 19 at the inner side of the wall 7 and spring outwardly into positive locking engagement with the adjacent marginal portions of said wall 7 bordering said slot 19, as aforesaid. On removal of the pressure on said tensioned head portions 36, said head portions attempt to assume their initial untensioned inwardly inclined condition and thereby exert a reverse axial pull on said spaced body portions 22, 24, which maintains said shoulders 38 in tensioned positive locking engagement with the inner side of the wall 7 adjoining the slot 19. The head portions 36 remain partially tensioned in engagement with the outer side of said wall 7 such that the fastener is secured in said slot 19 by the shoulders 38 and head portions 36 cooperating in positive locking engagement with the opposite sides of said wall 7 adjacent said slot 19 under continuously effective spring tension. This provides for a strong and very rigid mounting of the fastener 20 in the slot 19 at all times in a manner whereby said fastener 20 is not subject to loosening or displacement under the most severe service conditions, thereby insuring that the nut portion 28 or 30 or other stud engaging means on the fastener is always in operative position for properly engaging and effectively retaining in secured position the bolt, screw or other stud 17 holding the cover, front or other closure 11 onto the box 1, cabinet or other receptacle, as shown in Fig. 5.

It is to be appreciated that the combined nut and clip device 20 of the invention, otherwise, is admirably suited for use as a fastener of general utility for securing plates, panels, and similar parts at right angles, or the like, in a completed assembly. In any such assembly, the fastener 20 is readily attached in a similar wall opening or slot 19 in a supporting plate, panel, or the like, in the manner described, to serve as a nut for threadedly engaging a bolt, screw or other stud in securing a cooperating plate, panel or other part in normal or other angular relation to said supporting plate, panel, or the like.

The combined nut and clip fastener 20 of the invention preferably is constructed of relatively thin sheet metal the thickness of which is selected according to service requirements and the predetermined size of the members of the assembly. The fastener is most effective when provided of spring metal suitably tempered and otherwise treated to give the desired toughness and hardness, particularly in the case of devices which are intended for heavy duty applications. A cheap and highly satisfactory fastener 20 may be provided from cold rolled metal such as cold rolled steel which is untempered but of a spring metal nature and capable of providing an effective and reliable securing device as and for the purposes described.

While the invention has been described in detail with specific examples, such examples are intended as illustrations only inasmuch as the invention fully contemplates various modifications which may be provided without departing from the spirit and scope of the invention.

What is claimed is:

1. In a construction for securing a closure over a receptacle, said receptacle comprising a wall provided with an opening adjacent the end of said wall on which said closure is adapted to seat in angular relation therewith, a fastener attached to said wall from the outer side thereof, said fastener comprising a strip of metal bent into generally U-shaped form defining a pair of spaced expansible body portions extending through said opening and being resiliently urged into engagement with defining surfaces of said opening, stud-engaging means one one of said spaced body portions projecting from the inner side of said wall, said stud-engaging means extending in a direction generally transverse to the direction of extension of said one of said body portions and in position to engage a laterally movable stud cooperating with said closure for securing the latter over said receptacle, a shoulder on at least one of said body portions engaging the inner side of said wall, said shoulder extending out of the plane of the associated of said body portions and toward the free end thereof, and means on at least one of said spaced body portions engaging the outer side of said wall adjacent said opening and cooperating with said shoulder to retain the fastener in attached position in said opening.

2. In a construction for securing a closure over a receptacle comprising a wall provided with an opening adjacent the end of said wall on which said closure is adapted to seat in generally right angled relation therewith, a fastener attached to said wall from the outer side thereof, said fastener comprising a piece of sheet metal formed into a generally U-shaped configuration defining a pair of spaced expansible body portions extending through said opening and being urged into abutting relation with defining surfaces of said opening, stud-engaging means on one of said spaced body portions projecting from the inner side of said wall, said stud-engaging means extending in a direction generally transverse to the direction of extension of said one of said body portions and in position to engage a laterally movable stud mounted on said closure for securing the latter over said receptacle, a shoulder partially sheared out of each of said spaced body portions, said shoulders extending outwardly from the respective planes of said body portions toward the free ends thereof and engaging the inner side of said wall adjacent said opening, and head portions adjacent the free ends of said body portions engaging the outer side of said wall adjacent said opening and cooperating with said shoulders in retaining the fastener in attached position in said opening, said head portions being inclined inwardly away from a plane passing through the free ends of said body portions in generally perpendicular relation to the latter to engage in resilient relation said outer side of said wall and thereby provide an outwardly acting axial tension on said body portions.

3. In a construction in accordance with claim 2 including an abutment on one of said spaced body portions engaging the other of said body portions to limit inward movement of said body portions with respect to one another, said abutment being disposed in said opening generally intermediate said shoulders and said head portions.

4. A fastener comprising a piece of sheet metal formed into a generally elongated U-shaped configuration defining a pair of spaced expansible body portions adapted to extend through an opening in a wall and engage defining surfaces of said opening, stud-engaging means on one of said spaced body portions, said stud-engaging means extending in a direction generally transverse to the direction of extension of said body portions and being adapted to engage a stud for securing a cooperating part in angular relation to said wall, a head portion on at least one of said spaced body portions adapted to engage one side of said wall adjacent said opening, and a shoulder on at least one of said spaced body portions in inwardly spaced relation to said head portion, said shoulder extending out of the plane of the associated of said body portions in a direction toward the free end thereof and adapted to engage the opposite side of said wall adjacent said opening and cooperate with said head portion in retaining the fastener in attached position in said opening.

5. A fastener comprising a piece of sheet metal formed into a generally elongated U-shaped configuration defining a pair of spaced expansible body portions adapted to extend through an opening in a wall and engage defining surfaces of said opening, stud-engaging means on one of said spaced body portions, said stud-engaging means extending in a direction generally transverse to the direction of extension of said body portions and being adapted to engage a threaded stud for securing a cooperating part in generally angular relation to said wall, a hole extending through the other of said body portions in the same general direction as said stud-engaging means and being substantially axially aligned therewith, said hole providing for the unrestricted passage of the leading end of the threaded stud therethrough in the secured position of the latter, head portions on the free ends of said spaced body portions adapted to engage one side of said wall adjacent said opening, said head portions being inclined away from a plane passing through the free ends of said body portions in generally perpendicular relation therewith, and in the direction of said stud-engaging means, to provide a resilient engagement of said head portions with respect to said wall, a shoulder on each of said body portions in spaced relation to the associated of said head portions and adapted to engage the opposite side of said wall adjacent said opening and cooperating with said head portions in retaining the fastener in attached position in said opening, said shoulders being formed out of the associated of said body portions and extending outwardly of the respective plane of the latter toward the free ends thereof, said shoulders comprising external inclined guide surfaces thereon for facilitating movement of said shoulders through said opening and into snap-fastening engagement with said opposite side of said wall, and a projection formed from one of said body portions generally intermediate said shoulders and said head portions and extending inwardly toward the other of said body portions, said projection being adapted to engage said other body portion to limit inward movement of said body portions with respect to one another.

6. A fastener in accordance with claim 5 wherein each of said shoulders is disposed adjacent a lateral extremity of the associated of said body portions and said projection is disposed generally centrally of the lateral edges of the associated of said body portions.

References Cited in the file of this patent

UNITED STATES PATENTS

| | | |
|---|---|---|
| Re. 22,543 | Tinnerman | Sept. 5, 1944 |
| 2,359,268 | Jacocks et al. | Sept. 26, 1944 |
| 2,661,821 | Tinnerman | Dec. 8, 1953 |
| 2,706,127 | Stieglitz | Apr. 12, 1955 |
| 2,733,944 | Chvosta | Feb. 7, 1956 |
| 2,804,116 | Van Niel et al. | Aug. 27, 1957 |